(12) United States Patent
Gonthier

(10) Patent No.: US 7,539,377 B2
(45) Date of Patent: May 26, 2009

(54) METHOD AND DEVICE FOR OPTICALLY COUPLING OPTICAL FIBRES

(76) Inventor: François Gonthier, 1144 rue de Père Vimont, Quebec, Quebec (CA) G1S 3P8

( * ) Notice: Subject to any disclaimer, the term of this patent is extended or adjusted under 35 U.S.C. 154(b) by 0 days.

(21) Appl. No.: 11/976,476

(22) Filed: Oct. 25, 2007

(65) Prior Publication Data
US 2008/0170823 A1  Jul. 17, 2008

Related U.S. Application Data

(60) Provisional application No. 60/879,817, filed on Jan. 11, 2007.

(51) Int. Cl.
*G02B 6/26* (2006.01)
*G02B 6/42* (2006.01)

(52) U.S. Cl. .......................... 385/39; 385/43
(58) Field of Classification Search ................ 385/43, 385/27, 49, 39
See application file for complete search history.

(56) References Cited

U.S. PATENT DOCUMENTS

| | | | |
|---|---|---|---|
| 5,815,309 A * | 9/1998 | Lawrence et al. | 359/333 |
| 6,219,480 B1 * | 4/2001 | Cassarly et al. | 385/46 |
| 6,385,371 B1 * | 5/2002 | Li | 385/43 |
| 6,731,837 B2 * | 5/2004 | Goldberg et al. | 385/27 |
| 7,277,612 B2 * | 10/2007 | Sintov | 385/43 |
| 2007/0031088 A1 * | 2/2007 | Lu | 385/49 |
| 2008/0050069 A1 * | 2/2008 | Skovgaard et al. | 385/39 |

* cited by examiner

*Primary Examiner*—Frank G Font
*Assistant Examiner*—Robert Tavlykaev

(57) ABSTRACT

An optical coupler, the optical coupler being usable with a first optical fiber and a second optical fiber. The second optical fiber defines a second fiber coupling section and a second fiber transmitting section extending from the second fiber coupling section. The second fiber coupling section defines a radially outwardmost peripheral surface, the radially outwardmost peripheral surface defining a peripheral surface coupling portion. The optical coupler includes a coupler first end section and a substantially opposed coupler second end section, the coupler first end section defining a first coupling surface. The optical coupler defines a second coupling surface extending along the coupler first and second end sections. The first coupling surface is optically couplable with the first optical fiber and the second coupling surface is positionable so as to extend substantially parallel to the peripheral surface coupling portion and to be optically coupled with the peripheral surface coupling portion. The optical coupler has optical and geometrical properties such that substantially all the light guided to the first coupling surface by the first optical fiber is directed towards the second coupling surface and into the second optical fiber through the peripheral surface coupling portion so as to be guided into the second fiber coupling section for transmission into the second fiber transmitting portion.

6 Claims, 8 Drawing Sheets

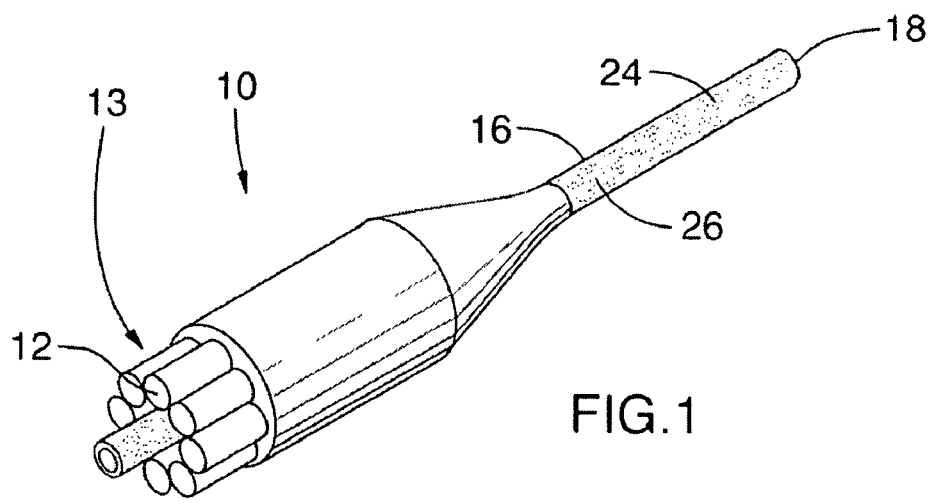
FIG.1
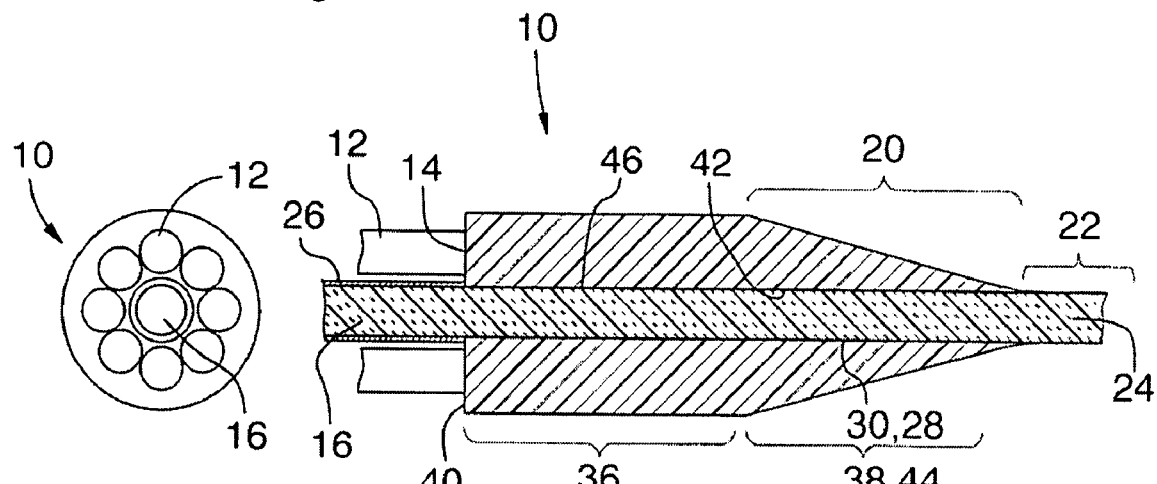
FIG.2
FIG.3
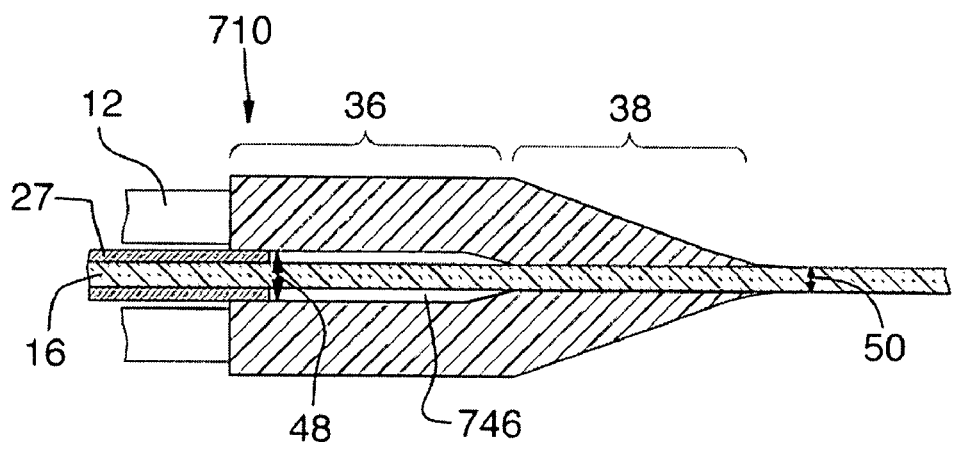
FIG.4

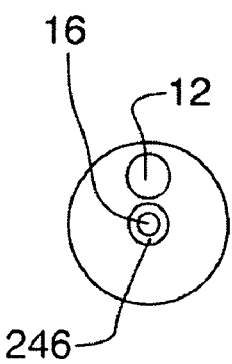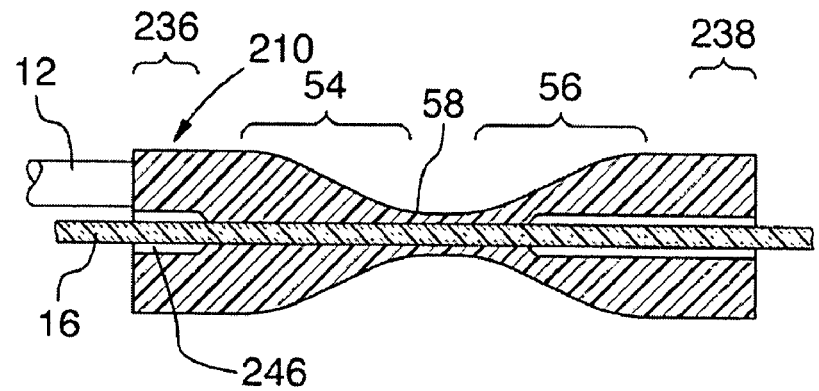
FIG.9  FIG.8A
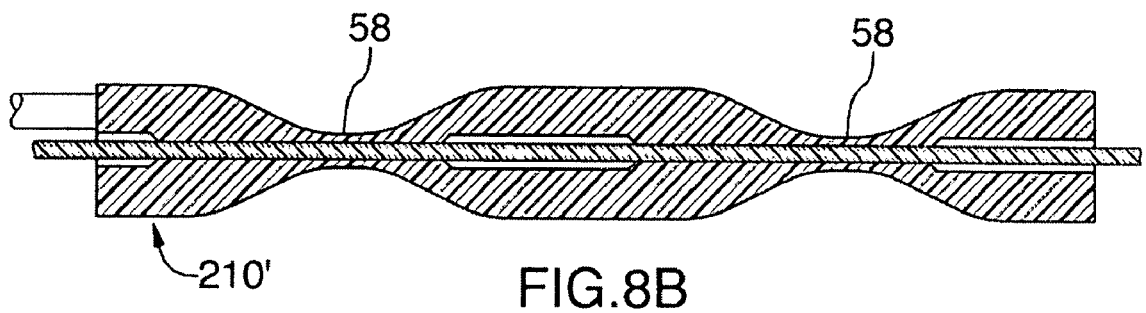
FIG.8B
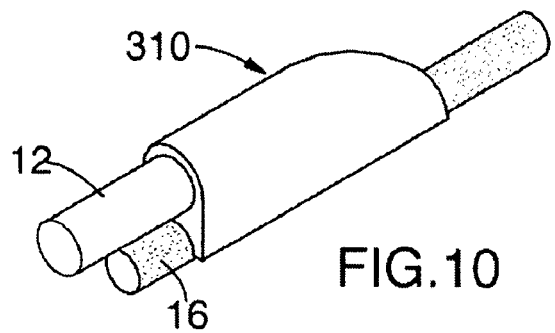
FIG.10
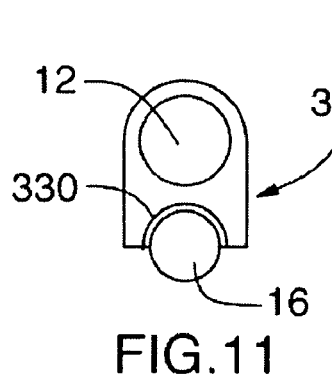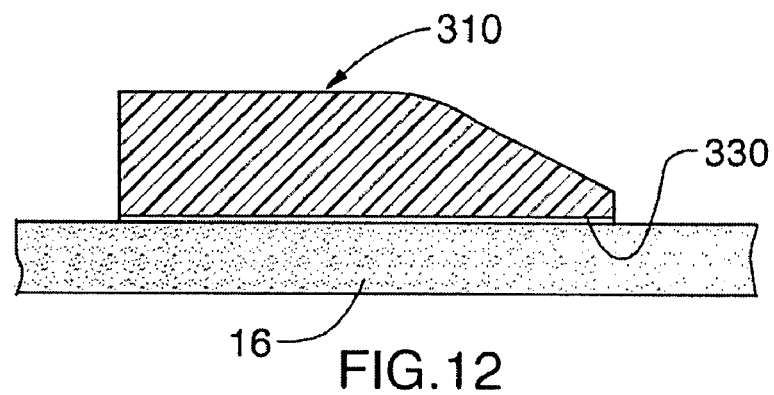
FIG.11  FIG.12

METHOD AND DEVICE FOR OPTICALLY COUPLING OPTICAL FIBRES

This application claims the benefit of U.S. provisional application No. 60/879,817, filed on Jan. 11, 2007, the contents of which is hereby incorporated by reference in its entirety.

FIELD OF THE INVENTION

The present invention relates to the general field of optical fibers, and is particularly concerned with methods and devices for optically coupling optical fibers.

BACKGROUND OF THE INVENTION

There are many occurrences wherein it is desirable to optically couple two or more optical fibers to each other. For example. In optical amplification, a signal fiber carries a signal and is optically pumped using laser light having another wavelength to amplify the signal. To that effect, the laser light coming from the pump fibers is carried into the signal fiber and thereby provides the power required to amplify the signal circulating in, the signal fiber.

Many techniques are available for optically coupling optical fibers to each other in this manner. For example, in one such technique, the optical fibers are stripped of their sheath and heated while positioned substantially adjacent to each other until the pump fibers are fused and optically coupled to the signal fiber. This involves deforming the pump fibers until they achieve a shape suitable for optically coupling to the signal fiber.

However, coupling the pump fiber typically occurs by deforming to a relatively large extend the pump fiber around the periphery of the cladding of the signal fiber. This creates surface tension problems that result in power losses. Since it is desirable, in many instances, to pump relatively large power into the signal fiber, these power losses may heat the optical fibers and eventually lead to failure of the optical amplifier. In addition, these methods for manufacturing optical amplifiers and other devices in which optical fibers are optically coupled to each other are relatively difficult to perform and it is relatively difficult to achieve reproducible results using these methods.

Another manner of optically coupling pump fibers to a signal fiber involves the use of a signal fiber having a relatively large diameter. Then, the pumped fibers may be axially coupled to the cladding of the signal fiber which is then deformed to achieve a shape suitable for guiding the light carried by the pump fibers into the core of the signal fiber. Once again, these methods for manufacturing optical fibers are relatively complex to implement. Also, they may lead to the creation of stresses within the coupled assemblies, as there is typically a need to handle the optical fibers and attach them to supports for packaging purposes.

Against this background, there exists a need in the industry to provide an improved methods and devices for optically coupling optical fibers. An object of the present invention is therefore to provide such methods and devices for optically coupling optical fibers.

SUMMARY OF THE INVENTION

In a broad aspect, the invention provides an optical coupler, the optical coupler being usable with a first optical fiber and a second optical fiber. The second optical fiber defines a second fiber coupling section and a second fiber transmitting section extending from the second fiber coupling section. The second fiber coupling section defines a radially outwardmost peripheral surface, the radially outwardmost peripheral surface defining a peripheral surface coupling portion. The optical coupler includes a coupler first end section and a substantially opposed coupler second end section, the coupler first end section defining a first coupling surface. The optical coupler defines a second coupling surface extending along the coupler first and second end sections. The first coupling surface is optically couplable with the first optical fiber and the second coupling surface is positionable so as to extend substantially parallel to the peripheral surface coupling portion and to be optically coupled with the peripheral surface coupling portion. The optical coupler has optical and geometrical properties such that substantially all the light guided to the first coupling surface by the first optical fiber is directed towards the second coupling surface and into the second optical fiber through the peripheral surface coupling portion so as to be guided into the second fiber coupling section for transmission into the second fiber transmitting portion.

In another broad aspect, the invention provides a method for assembling an optical coupling assembly for optically coupling a first and a second optical fiber using an optical coupler, the second optical fiber defining a second fiber coupling section and a second fiber transmitting section extending from the second fiber coupling section, the second fiber coupling section defining a radially outwardmost peripheral surface, the radially outwardmost peripheral surface defining a peripheral surface coupling portion, the optical coupler including a coupler first end section and a substantially opposed coupler second end section, the coupler first end section defining a first coupling surface, the optical fiber defining a second coupling surface extending along the coupler first and second end sections. The method includes: positioning the first optical fiber substantially adjacent to the first coupling surface; optically coupling the first optical fiber and the first coupling surface to each other; positioning the second optical fiber such that the second coupling surface is substantially adjacent and substantially parallel to the peripheral surface coupling portion; and optically coupling the second coupling surface and the peripheral surface coupling portion to each other.

In yet another broad aspect, the invention provides a method for assembling an optical coupling assembly for optically coupling a first, a second and a third optical fiber using an optical coupler, the first, second, and third optical fiber each defining respectively a first, a second and a third fiber free end, the optical coupler including a coupler first end section and a substantially opposed coupler second end section, the coupler first end section defining a first coupling surface, the optical coupler defining a coupler passageway extending along the first and second end sections. The method includes: positioning the first optical fiber free end substantially adjacent to the first coupling surface; optically coupling the first optical fiber and the first coupling surface to each other; inserting the second optical fiber, at least partially, into the coupler passageway; optically coupling the optical coupler and the second optical fiber into the coupler passageway; positioning the third fiber free end substantially adjacent to the second fiber free end; and optically coupling the second and third fiber free ends to each other.

In yet another broad aspect, the invention provides an optical coupling assembly, the optical coupling assembly including a first optical fiber, a second optical fiber, the second optical fiber defining a second fiber coupling section and a second fiber transmitting section extending from the second fiber coupling section, the second fiber coupling section defining a radially outwardmost peripheral surface, the radially outwardmost peripheral surface defining a peripheral surface coupling portion and an optical coupler. The optical coupler defines a coupler first end section and a substantially opposed coupler second end section, the coupler first end section defining a first coupling surface, the first optical fiber being optically coupled with the first coupling surface. A second coupling surface extends between the coupler first and second end sections, the second coupling surface being substantially parallel to the peripheral surface coupling portion and optically coupled thereto. The optical coupler has optical and geometrical properties such that substantially all the light guided to the first coupling surface by the first optical fiber is directed towards the second coupling surface and into the second optical fiber through the peripheral surface coupling portion so as to be guided into the second fiber coupling section for transmission into the second fiber transmitting portion.

Advantageously, the optical coupler allows to relatively easily assemble together the optical coupler and the first and second optical fibers. Furthermore, the optical coupler and optical fibers assembly is relatively robust and relatively efficient in transmitting power between the first optical fiber and the second optical fiber.

Yet, furthermore, the proposed optical coupler allows to relatively easily optimize relationships between the cross-sectional area over which the light propagating in the first and second optical fibers and the numerical apertures of the first and second optical fibers so as to optimize power transmission between the first optical fiber and the second optical fiber.

Another advantage of the present optical coupler resides in the possibility to optically couple to many types of optical fiber that are often difficult to couple to conventionally, such as for example monomode fibers, polarisation-maintaining fibers and microstructured fibers, among other possibilities.

The present invention has also an advantage that it facilitates the coupling of optical fibers that are heat sensitive as the second optical fiber may be glued to the optical coupler. Furthermore, since the first optical fiber may be fused with the optical coupler before inserting the second optical fiber, the second optical fiber can also be heat sensitive and nevertheless be used with the proposed optical coupler according to the invention.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1, in a perspective view, illustrates an optical coupler in accordance with an embodiment of the present invention optically coupled to two optical fibers;

FIG. 2, in a rear plan view, illustrates the optical coupler shown in FIG. 1;

FIG. 3, in a side cross-sectional view, illustrates the optical coupler shown in FIGS. 1 and 2;

FIG. 4, in a side cross-sectional view, illustrates an optical coupler in accordance with an alternative embodiment of the present invention optically coupled to two optical fibers;

FIG. 8A, in a side cross-sectional view, illustrates an optical coupler in accordance with yet another alternative embodiment of the present invention optically coupled to two optical fibers;

FIG. 8B, in a side cross-sectional view, illustrates an optical coupler in accordance with yet another alternative embodiment of the present invention optically coupled to two optical fibers;

FIG. 9, in a rear elevation view, illustrates the optical coupler shown in FIG. 8;

FIG. 10, in a perspective view, illustrates an optical coupler in accordance with yet another embodiment of the invention optically coupled to two optical fibers;

FIG. 11, in a rear plan view, illustrates the optical coupler shown in FIG. 10;

FIG. 12, in a side cross-sectional view with parts removed, illustrates the optical coupler shown in FIGS. 10 and 11;

DETAILED DESCRIPTION

Figure 5:
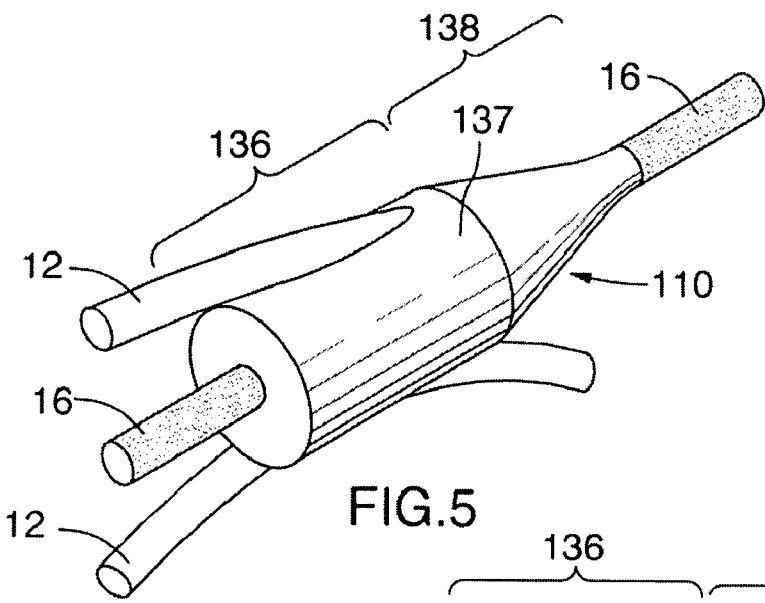
FIG. 5, in a perspective view, illustrates an optical coupler in accordance with another alternative embodiment of the invention optically coupled to three optical fibers.

FIGS. 1 to 3 illustrate an optical coupler 10 in accordance with an embodiment of the present invention. The optical coupler 10 is usable for optically coupling a first optical fiber 12 to a second optical fiber 16. In some embodiments of the invention, as seen in FIGS. 1 to 3, more than one optical fiber 12 are optically coupled to the second optical fiber 16. For example, these other optical fibers take the form of a bundle of optical fibers 13. In summary, the optical coupler 10 is manufacturable such that it includes a surface for coupling to the second optical fiber 16 in a substantially radial direction. The surface is formed so as to have a shape that substantially conforms to the outer surface of the second optical fiber 16.

The optical coupler 10 is configured and has optical properties such that essentially all the light incoming at the first optical fiber 12 is guided into the second optical fiber 16. Typically, this is achieved by adiabatically tapering the optical coupler 10 into the second optical fiber 16 substantially opposite to the first optical fiber 12. To that effect, the optical coupler 10 is configured so as to be substantially tangential to the second optical fiber at a location wherein the optical coupler 10 ceases to contact the optical fiber 16. This results in the optical coupler 10 coupling the light incoming at the first optical fiber 12, and at the other optical fibers of the bundle of optical fibers 13, to the cladding of the second optical fiber 16.

Typically, the optical coupling between the first optical fiber 12 and the second optical fiber 16 is a multimode coupling. In this case, the first optical fiber 12, and the other optical fibers 12 of the bundle of optical fibers 13 are multimode fibers. In various embodiments of the invention, the second optical fiber 16 is a multimode optical fiber, a multiple core optical fiber, a double-clad optical fiber, a single-mode optical fiber or any other suitable optical fiber.

Referring to FIG. 3, the first optical fiber 12 defines a first fiber free end 14. It should be understood that the first fiber free end 14 is here shown attached to the optical coupler 10. The term "free end" therefore applies to the configuration of the first optical fiber 12 before it is coupled to the optical coupler 10. Although not shown in the drawings, the first optical fiber 12 includes a first fiber core and a first fiber cladding extending substantially radially outwardly from the first fiber core.

Referring to FIG. 1, the second optical fiber 16 defines a second fiber free end 18. Also, as seen in FIG. 3, the second optical fiber 16 includes a second fiber core 24 and a second fiber cladding 26 extending substantially radially outwardly from the second fiber core 24. Typically, the second fiber core and cladding 24 and 26 are both substantially cylindrical. For clarity reasons, the second fiber core and cladding 24 and 26 are not distinguishly shown in the other Figures of the present application.

As better seen in FIG. 3, the second optical fiber 16 defines a second fiber coupling section 20 and a second fiber transmitting section 22 extending from the second fiber coupling section 20. The second fiber coupling section 20 defines a radially outwardmost peripheral surface 28. The radially outwardmost peripheral surface 28 is typically defined by the second fiber cladding 26. The radially outwardmost peripheral surface 28 defines a peripheral surface coupling portion 30. The peripheral surface coupling portion 30 is a portion of the radially outwardmost peripheral surface 28 through which light coming from the first optical fiber 12, or from other similarly located optical fibers, enters into the second optical fiber 16. In the optical coupler shown in FIGS. 1 to 3, the peripheral surface coupling portion 30 and the radially outwardmost peripheral surface 28 are substantially the same as light may enter the second optical fiber 16 from any direction.

The optical coupler 10 defines a coupler first end section 36 and a substantially opposed coupler second end section 38. The coupler first end section 36 defines a first coupling surface 40. Also, the optical coupler 10 defines a second coupling surface 42 extending along the coupler first and second end sections 36 and 38. In the embodiment of the invention shown in FIGS. 1 to 3, the coupler second end section 38 extend substantially longitudinally from the coupler first end section 36. However, in alternative embodiments of the invention, the coupler first and second end sections 36 and 38 are not adjacent to each other.

The first optical fiber 12 is optically coupled with the first coupling surface 40. Also, the peripheral surface coupling portion 30 is positionable so as to extend substantially parallel to the second coupling surface 42 and is optically coupled with the second coupling surface 42.

The optical coupler 10 has optical and geometrical properties such that substantially all the light guided to the first coupling surface 40 by the first optical fiber 12 is directed towards the second coupling surface 42 and into the second optical fiber 16 through the peripheral surface coupling portion 30 so as to be guided into the second fiber coupling section 20 for transmission into the second fiber transmitting section 22.

For example, this is achieved by having an optical coupler 10 that includes a tapered section 44 tapering in a direction leading from the coupler first end section 36 towards the coupler second end section 38. For example, and non-limitingly, the tapered section 44 is located substantially distally relatively to the first fiber free end 14 and extends substantially longitudinally from the coupler first end section 36. In a specific embodiment of the invention shown in FIGS. 1, 2 and 3, the coupler first end section 36 is substantially cylindrical and the coupler second end section 38 is substantially frustoconical and therefore forms the tapered section 44. The rotational symmetry of these configurations facilitates manufacturing of the optical coupler 10 and the attachment of many optical fibers to the first coupling surface 40.

The optical coupler 10 defines a coupler passageway 46 extending along the coupler first and second end sections 36 and 38. More specifically, the coupler passageway 46 extends between the ends of the optical coupler 10. The second coupling surface 42 is located substantially peripherally relatively to the coupler passageway 46. In other words, the internal surface of the optical coupler 10 defining the coupler passageway 46 is, in this embodiment of the invention, the second coupling surface 42. The second coupling surface 42 is therefore substantially cylindrical. This configuration allows to have many optical fibers similar to the first optical fiber 12 attached to the optical coupler 10 such that the light incoming for all these optical fibers is guidable into the second optical fiber 16.

As seen in FIG. 1, the coupler passageway 46 is radially substantially centrally located relatively to the coupler first end section 36. However, it should be noted that, as described in further details hereinbelow, many other suitable shapes exist for the optical coupler 10.

Figure 24:
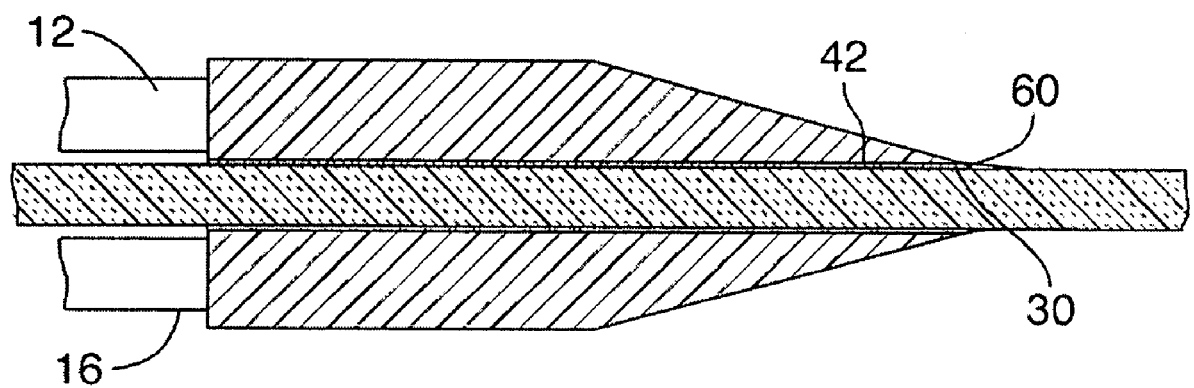
FIG. 24, in a side cross-sectional view, illustrates the optical coupler shown in FIG. 23.

As better seen in FIG. 24, in some embodiments of the invention, the peripheral surface coupling portion 30 is optically coupled to the second coupling surface 42 by a coupling medium 60 located between the second coupling surface 42 and the peripheral surface coupling portion 30. An example of such a coupling medium 60 is ethanol or any other suitable transparent liquid. Another example of such a coupling medium 60 is a bonding material. Typically, the coupling medium 60 has a refraction index substantially similar to the refraction index of the second fiber cladding 26 (not seen in FIG. 24). Also, typically, the optical coupler 10 has also the same refraction index as the second fiber cladding 26 (not seen in FIG. 24). In other embodiments of the invention, as seen in FIGS. 1 to 3, the second coupling surface 42 and the peripheral surface coupling portion 30 are fused to each other.

The diameter of the coupler first end section 36 is selected as a function of the diameters and numerical apertures of the first and second optical fibers 12 and 16 such that optimal coupling between the first and second optical fibers 12 and 16 occurs.

As an example, in an embodiment of this invention, a cylindrical tube of 800 µm external diameter and 405 µm internal diameter is used. The tube is cut to the length of 2 cm. The tube is then etched or polished to obtain a conical shape over 1 cm at one end as per FIGS. 1-3 to complete manufacturing of the optical coupler 10. At the cylindrical end, forming the coupler first end section 36, up to 9 200-micron core fibers (numerical aperture (NA) of 0.22) can be fused to the first coupling surface 40. Once this is done, a 20 µm core/400 µm diameter double clad fiber is first stripped of its low index polymer jacket (NA=0.46 for the guiding cladding), then is cleaved to about 3 cm of the fiber jacket end. This fiber end is then inserted into the coupler passageway 46 of the optical coupler 10 from the end adjacent the first coupling surface 40 so that it exits from the other end. A second 20/400 µm double clad fiber is stripped and cleaved and the ends of the last two fibers are aligned to transmit light. This alignment is optimized and the fibers are spliced using a heat source. The heat source is than gradually scanned towards the conical part of the optical coupler 10, which thus collapses on the internal fiber, thus creating a coupling between the tube and the inner fiber. This enable light guided from the multimode optical fiber to be coupled into the double-clad fiber with only a few percent loss. The thus obtain optical structure is then packaged for protection.

Another embodiment of this invention is obtained by following than same procedure as above but use a 340 µm external diameter tube with a 130 internal diameter. Then, 6 105 µm core fibers with 0.15 NA can be spliced to the tube and a 125 µm cladding diameter double-clad fiber can be inserted into the coupler passageway 46 and coupled thereto after fusioning the various parts. This assembly thereby formed is also relatively low loss.

As seen in FIG. 1, the first optical fiber 12 is substantially longitudinally coupled to the first coupling surface 40. In other words, the first coupling surface 40 is substantially perpendicular to the first optical fiber 12. In this embodiment of the invention, the first coupling surface 40 is also substantially perpendicular to the second coupling surface 42. In these embodiments, there is an optimization of numerical apertures of the first and second optical fibers 12 and 16 that are usable efficiently to transfer light from the first optical fiber 12 to the second optical fiber 16.

In use, the optical coupler 10 is provided separately from the first and second optical fibers 12 and 16. Then, the first optical fiber 12 is positioned substantially adjacent to the first coupling surface 40. Afterwards, the first optical fiber 12 is optically coupled to the first coupling surface 40. For example, this is performed by splicing the first optical fiber with the first coupling surface. Afterwards, the second optical fiber 16 is positioned such that the second coupling surface 42 is substantially adjacent and substantially parallel to the peripheral surface coupling portion 30. Then, the second coupling surface 42 and the peripheral surface coupling portion 30 are optically coupled to each other.

For example, the second coupling surface 42 and the peripheral surface coupling portion 30 are optically coupled to each other by fusing the second coupling surface 42 and the peripheral surface coupling portion 30 to each other. In other embodiments of the invention, the second coupling surface 42 and the peripheral surface coupling portion 30 are secured to each other using a bonding material.

As mentioned hereinabove, the first optical fiber 12 is typically optically coupled to the optical coupler 10 and secured thereto prior to optically coupling and securing the second optical fiber 16 to the optical coupler 10. The substantially cylindrical shape of coupler first end section 36 then facilitates assembly of the optical coupler 10 into a suitable package as the optical coupler 10 may then be held through this cylindrical portion of the optical coupler 10 instead of being held through the first optical fiber 12. This reduces surface stresses at the interface between the first optical fiber 12 and the optical coupler 10. Similarly, since the second optical fiber 16 is inserted through the coupler passageway 46, stresses at the interface between the second optical fiber 16 and the optical coupler 10 are also thereby minimized.

As shown in FIG. 4, in alternative embodiments of the invention, an optical coupler 710 includes 1 coupler passageway 746 having a first diameter 48 in the coupler first end section 36 and the coupler second end section 38 has a second diameter 50. The second diameter 50 is substantially smaller than the first diameter 48. For example, this may be achieved by providing a coupler passageway 746 of substantially uniform diameter and then collapsing the coupler passageway 746 onto the second optical fiber 16. However, in alternative embodiments of the invention, this configuration of diameters is pre-manufactured before the second optical fiber 16 is inserted through the coupler passageway 746.

These embodiments of the invention are particularly advantageous in applications wherein it is desirable that a sheath 27 of the second optical fiber 16 be partially inserted into the coupler passageway 746. However in alternative embodiments of the invention, the sheath 27 is not inserted in the coupler passageway 746.

Figure 6:
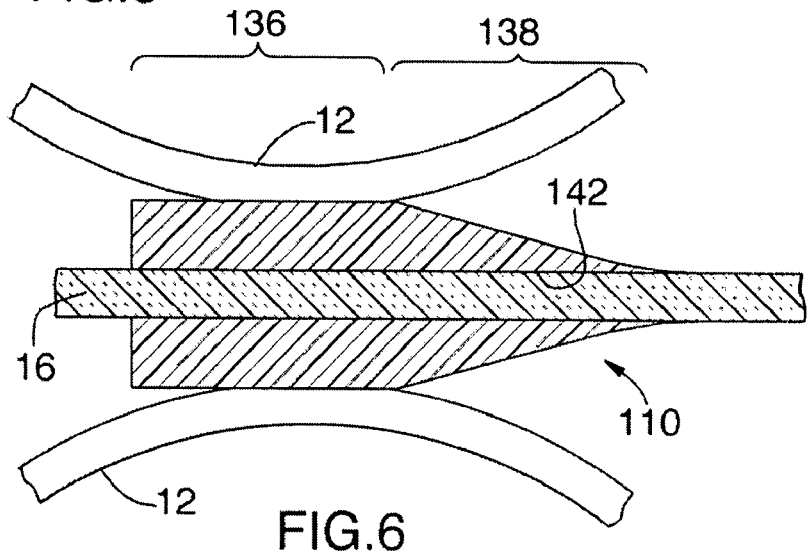
FIG. 6, in a side cross-sectional view, illustrates the optical coupler shown in FIG. 5 coupled to three optical fiber in a first manner.
Figure 7:
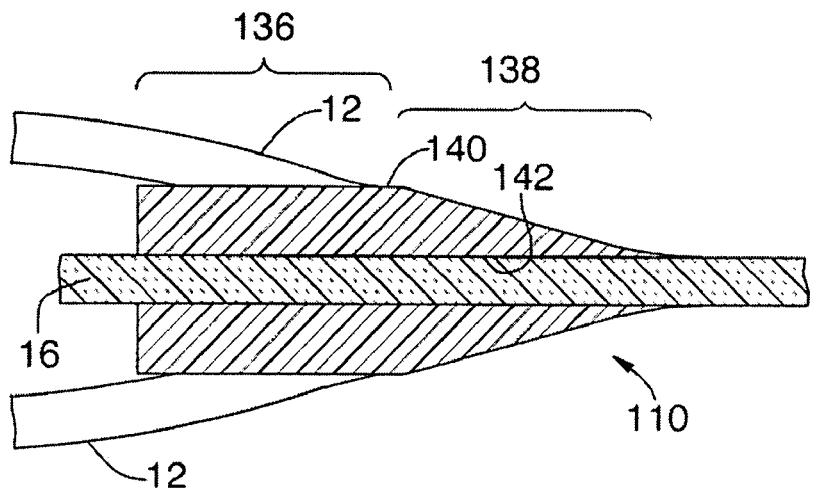
FIG. 7, in a side cross-sectional view, illustrates the optical coupler shown in FIGS. 5 and 6 coupled to three optical fiber in a second manner.

As shown in FIGS. 5, 6 and 7, in alternative embodiments of the invention, the first optical fiber 12 is spliced to the radially outwardmost peripheral surface 137 of the coupler first end section 136 of an alternative optical coupler 110. In these embodiments of the invention, the first and second coupling surfaces 140 and 142, better seen in FIG. 6, are therefore parallel to each other, but this is not necessarily the case in all embodiments of the invention. This may be achieved by terminating the first optical fiber 12 at the optical coupler 110 or by tangentially optically coupling the first optical fiber 12 to the optical coupler 110. While FIG. 5 represents en embodiment of the invention wherein these two types of coupling are present simultaneously, typically all the first optical fibers 12 coupled to an optical coupler 110 either terminate at the optical coupler 110, as seen in FIG. 7, or are tangentially optically coupled to the first optical coupler 110, as seen in FIG. 6.

In yet other embodiments of the invention, as shown in FIGS. 8A and 9, an alternative optical coupler 210 includes a first tapered section 54 tapering in a direction leading from a coupler first end section 236 towards a coupler second end section 238 and a second tapered section 56 tapering in a direction leading from the coupler second end section 238 towards the coupler first end section 236. The second tapered section 56 extends substantially adjacent to the first tapered section 54 so as to define a neck 58 in the optical coupler. Typically, the second optical fiber 16 is optically coupled to the optical coupler 210 in a region substantially adjacent the neck 58. By reducing as much as possible the cross-sectional surface area of the optical coupler 210 in the vicinity of the neck 58, a relatively large portion of the light incoming at the first optical fiber 12 is guided into the second optical fiber 16. Also, in similar embodiments of the invention, this percentage of light coupled into second optical fiber 16 may be increased by having an optical coupler 210' defining two or more necks 58, as shown in FIG. 8B. Furthermore, the power coupled into different sections of the second optical fiber 16 may be selected by varying a length over which the second optical fiber 16 is spaced apart from the internal surface of the coupler 210' between the two necks 58.

As shown in FIGS. 10, 11 and 12, in some embodiments of the invention, the second coupling surface 330 (better shown in FIG. 11) of an alternative optical coupler 310 is shaped substantially similarly to a circumferentially interrupted segment of a cylindrical shell. Therefore, in these embodiments of the invention, the second optical fiber 16 is not inserted through a passageway present in the optical coupler, but is instead abutted against the second coupling surface 230 prior to being optically coupled thereto. This configuration is particularly advantageous when a relatively small number of optical fibers are to be coupled to the second optical fiber 16. Indeed, it is then relatively more easily achievable to optically couple the first and second optical fibers 12 and 16 in this manner as this reduces the effective surface area of the optical coupler 210 that is used to couple the light into the second optical fiber 16 and, therefore, increases a range of numerical apertures of the first and second optical fibers 12 and 16 that may be used with the optical coupler 310.

Figure 13:
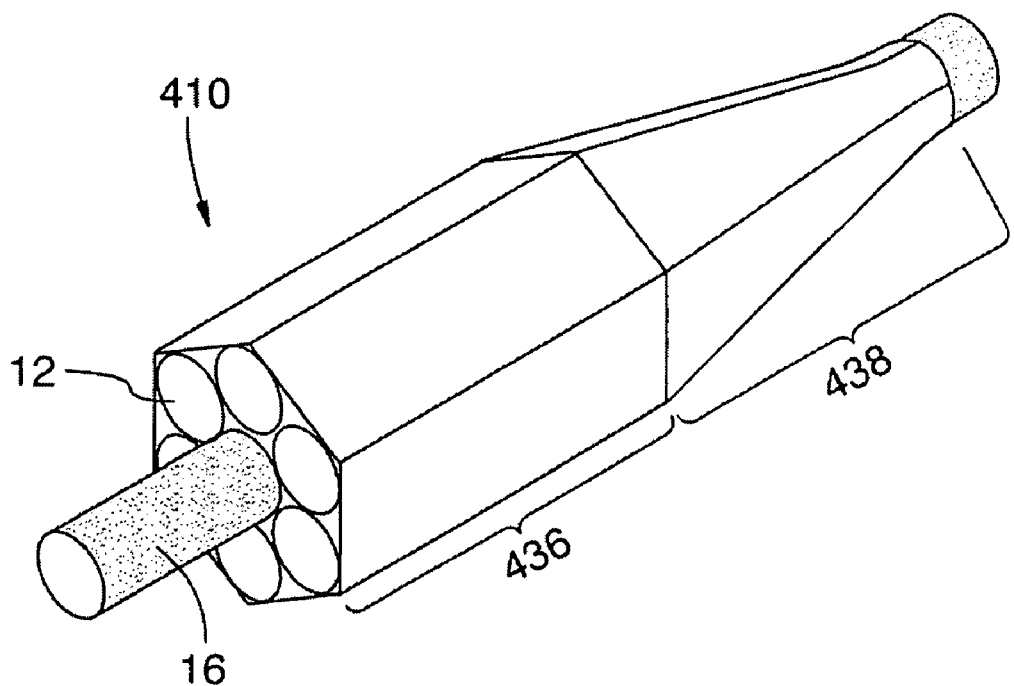
FIG. 13, in a perspective view, illustrates an optical coupler in accordance with yet another embodiment of the present invention optically coupled to one optical fiber.
Figures 14, 15:
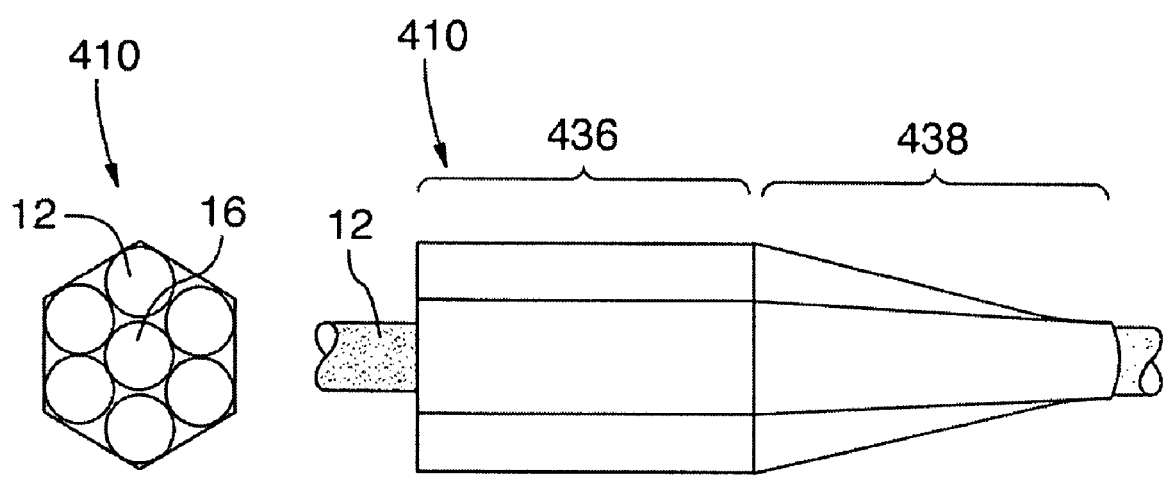
FIG. 14, in a rear plan view, illustrates the optical coupler shown in FIG. 13.
FIG. 15, in a side elevation view, illustrates the optical coupler shown in FIGS. 13 and 14.

In yet other embodiments of the invention, an optical coupler 410, shown in FIGS. 13, 14 and 15, has first and second end sections 336 and 338 (better seen in FIG. 35) that have substantially polygonal cross-sections in a direction substantially perpendicular to the second optical fiber 16. For example, as seen more specifically in FIG. 13, the coupler first and second end sections 436 and 438 have a substantially hexagonal cross-sectional configuration. The use of a polygonal cross-section instead of a circular cross-section in manufacturing the optical coupler 410 reduces the effective surface area in a direction perpendicular to light propagation and, therefore, once again, optimizes the optical coupling of the first optical fibers 12 (only the footprint of which is shown) and the second optical fiber 16 to each other with regards to constraints put on numerical apertures.

It should be noted that in alternative embodiments of the invention, any other polygonal configuration may be taken by an alternative optical coupler similar to the optical coupler 410. Also, in yet other alternative embodiments of the invention, only one of the coupler first and second end sections 436 and 438 of a similar optical coupler has a polygonal configuration.

In these embodiments, the polygonal configuration of the optical coupler 410 results in the different modes carried into the optical coupler 410 through the first optical fiber 12 to be more easily mixed and, therefore, produce optimal coupling to the second optical fiber 16 over a relatively small longitudinal distance.

Figures 16, 17:
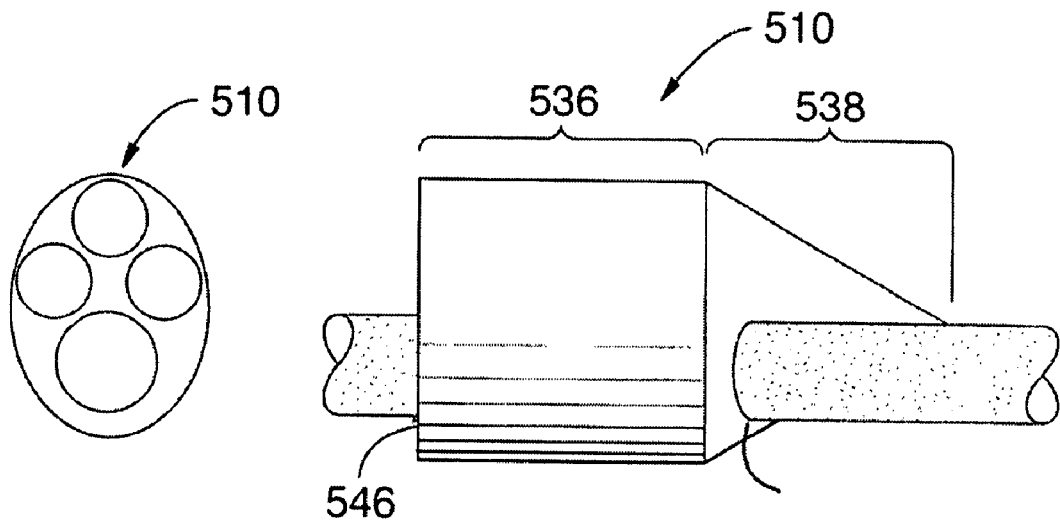
FIG. 16, in a side elevation view, illustrates an optical coupler in accordance with yet another embodiment of the present invention optically coupled to one optical fiber.
FIG. 17, in a rear plan view, illustrates the optical coupler shown in FIG. 16.
Figure 18:
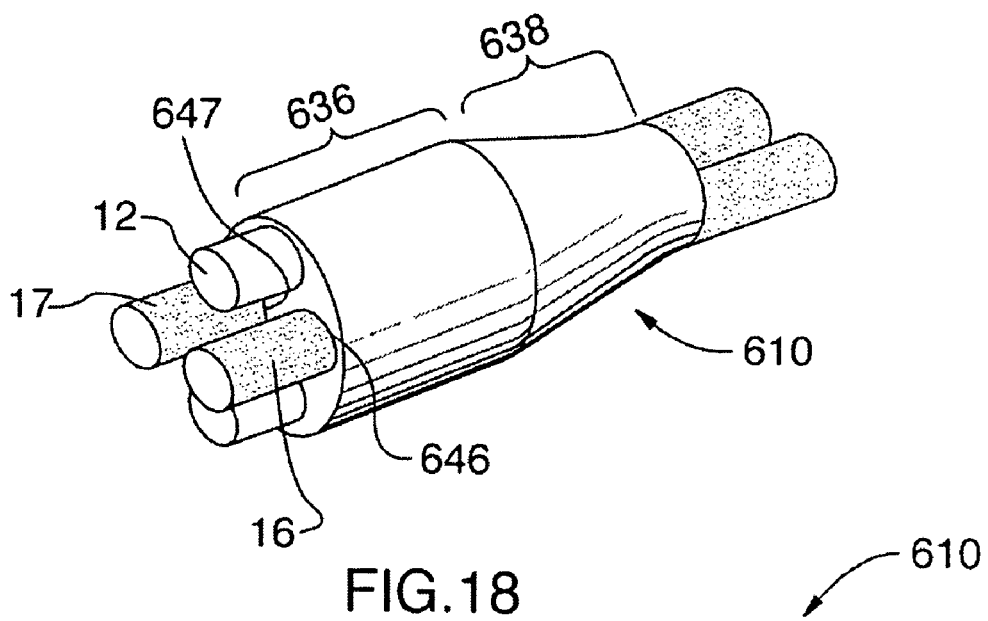
FIG. 18, in a side elevation view, illustrates an optical coupler in accordance with yet another embodiment of the present invention optically coupled to one optical fiber.

FIGS. 16 and 17 and FIGS. 18 and 19 respectively show optical couplers 510 and 610 according to yet other alternative embodiments of the present invention. Referring to FIG. 16, the optical coupler 510 is an optical coupler for which the coupler passageway 546 is radially substantially eccentrically located relatively to the coupler first end section 536. For example, this configuration is suitable for use when more than one optical fiber 12 must be optically coupled to the second optical fiber 16, but when the number of first optical fibers 12 is such that the use of a symmetrical optical coupler would cause undue constraints regarding the numerical apertures of the various optical fibers 12 and 16 that are coupled to each other. Disposing the second optical fiber 16 eccentrically relatively to the first optical fibers 12 allows to optimize the cross-sectional area of the optical coupler 10 as it relates to the ranges of numerical apertures of the optical coupler 510 and the first and second optical fibers 12 and 16 that are usable with each other.

The optical coupler 610 is usable, for example, in cases wherein the same optical fibers 12 are used to pump light into a second optical fiber 16 and a third optical fiber 17 that both extend through the optical coupler 610. To that effect, as seen for example in FIG. 18, the optical coupler 610 includes two coupler passageways 646 and 647 extending substantially longitudinally there through. Furthermore, in alternative embodiments of the invention, a similar optical coupler includes more than two coupler passageways.

Figure 19:
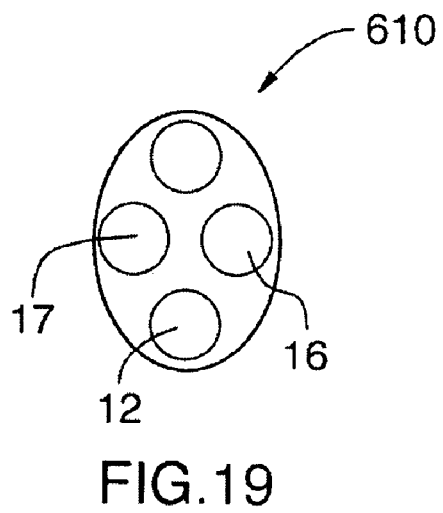
FIG. 19, in a rear plan view, illustrates the optical coupler shown in FIG. 18.

It should be noted that, as seen in FIGS. 17 and 19, optical couplers 510 and 610 need not to have rotational symmetry about a longitudinal axis. Indeed, The optical couplers 510 and 610 have substantially ellipsoidal cross-sectional configuration, once again in the aim of having a cross-sectional surface that is as small as possible while allowing coupling of a number of optical fibers that is as large as possible.

Figure 20:
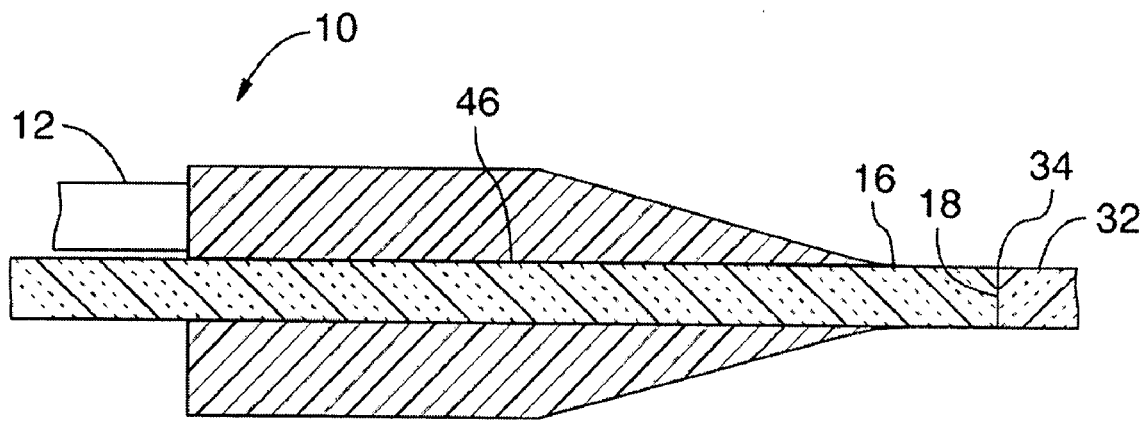
FIG. 20, in a side cross-sectional view, illustrates the optical coupler shown in FIGS. 1 to 3 optically coupled to two optical fibers, one of which is optically coupled outside of the optical coupler to a third optical fiber.
Figure 21:
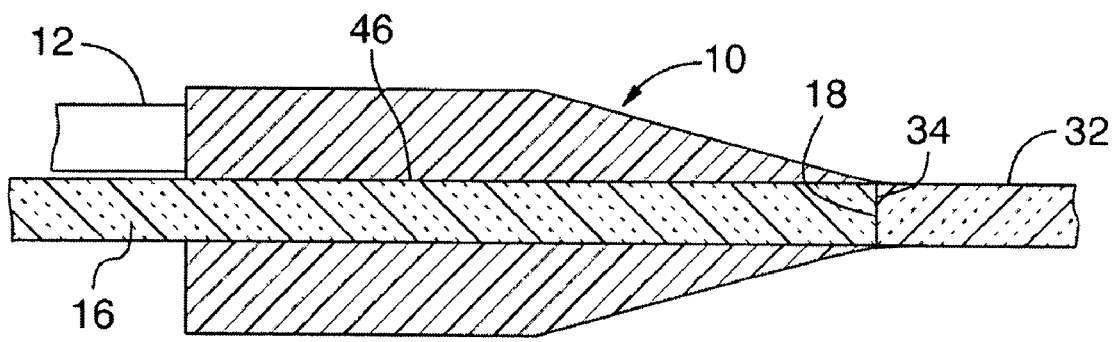
FIG. 21, in a side cross-sectional view, illustrates the optical coupler shown in FIGS. 1 to 3 optically coupled to two optical fibers, one of which is optically coupled at the end of the optical coupler to a third optical fiber.
Figure 22:
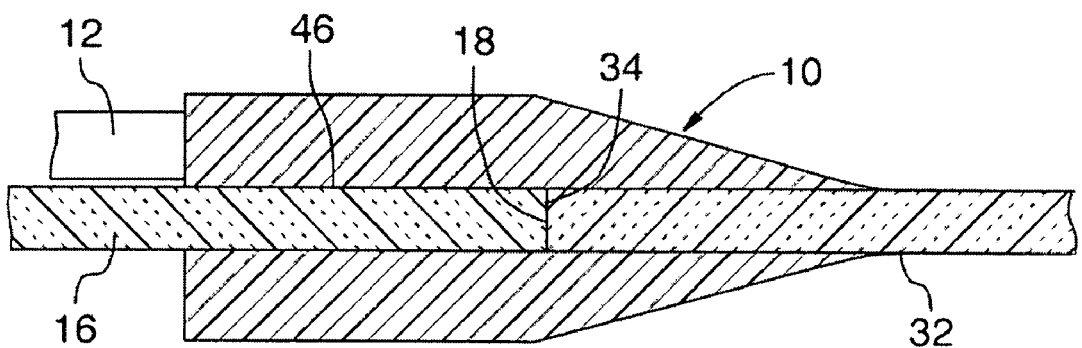
FIG. 22, in a side cross-sectional view, illustrates the optical coupler shown in FIGS. 1 to 3 optically coupled to two optical fibers, one of which is optically coupled inside of the optical coupler to a third optical fiber.
Figure 23:
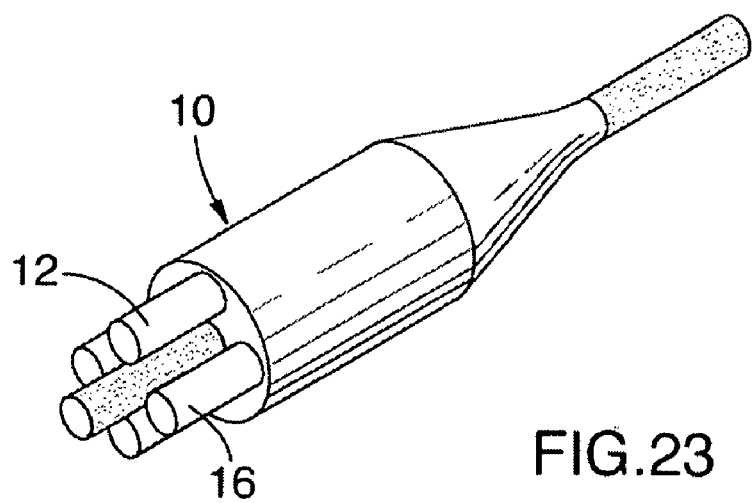
FIG. 23, in perspective view, illustrates the optical coupler shown in FIGS. 1 to 3 optically coupled to five optical fibers, one of which is glued to the optical coupler inside a coupler passageway extending longitudinally through the optical coupler.

As shown in FIGS. 20, 21 and 22, in some embodiments of the invention, the second optical fiber 16 is optically coupled also to a third optical fiber 32 which defines a third fiber free end 34. More specifically, the second and third fiber free ends 18 and 34 are positioned substantially adjacent to each other and are optically coupled such that light guided into the second optical fiber 16 is guided also into the third optical fiber 32. FIGS. 20, 21 and 22 respectively show embodiments of the invention wherein the second and third fiber free ends 18 and 34 are respectively located outside, at the end of and inside the coupler passageway 46. Also, in embodiments of the invention substantially similar to the optical coupler shown in FIGS. 8 and 9, the junction of the second and third optical fibers is typically located within the neck 58 of an optical coupler.

Figure 25:
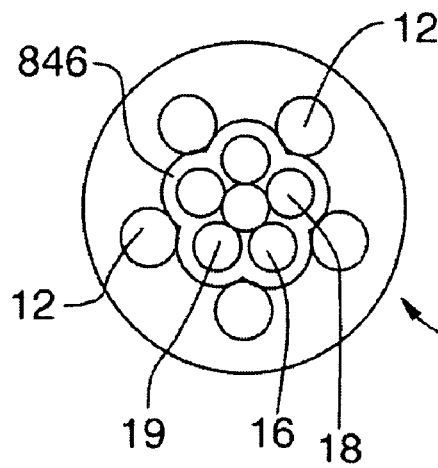
FIG. 25, in a rear elevation, illustrates an optical coupler in accordance with yet another embodiment of the present invention, one of which is part of a fiber bundle inserted through a coupler passageway of the optical coupler.

As seen in FIG. 25, in some embodiments of the invention, the second optical fiber 16 part of a bundle of optical fibers 19 inserted through a coupler passageway 846 of an alternative optical coupler 810. In these embodiments, optically coupling the first optical fiber 12 to the second optical fiber may include inserting the bundle of optical fibers 19 through a substantially cylindrical coupler passageway 846 and heating the optical coupler 810 so as to collapse the coupler passageway 846 onto the bundle of optical fibers 19.

Figure 26A:
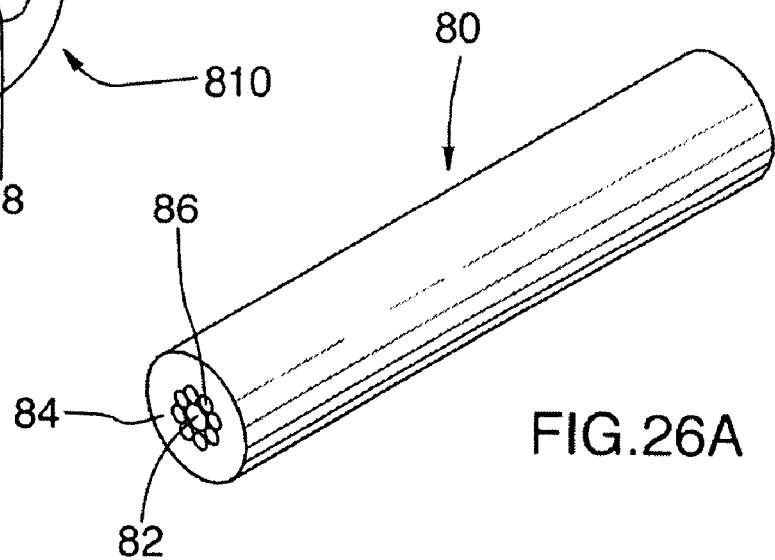
FIG. 26A, in a perspective view, illustrates a first step in a method for manufacturing an optical coupler in accordance with yet another embodiment of the present invention.
Figure 26B:
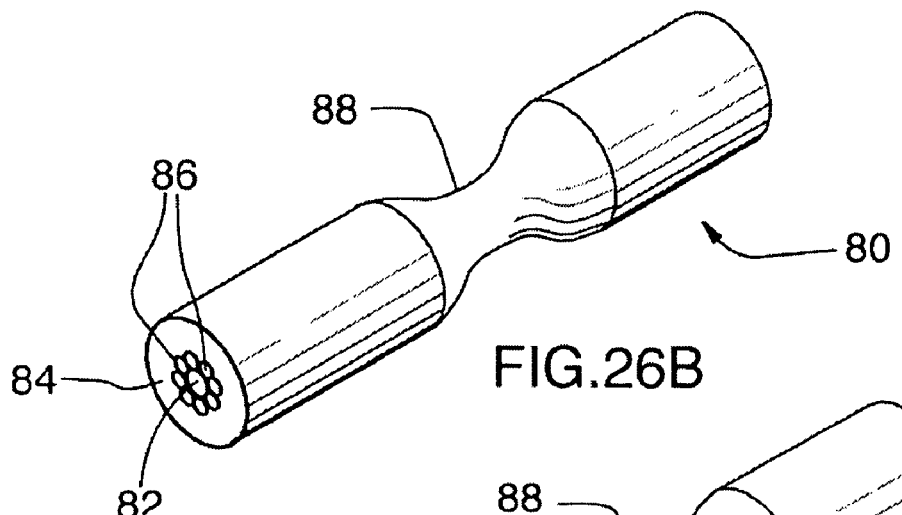
FIG. 26B, in a perspective view, illustrates a second step in the method for manufacturing an optical coupler illustrated in FIG. 26A.
Figure 26C:
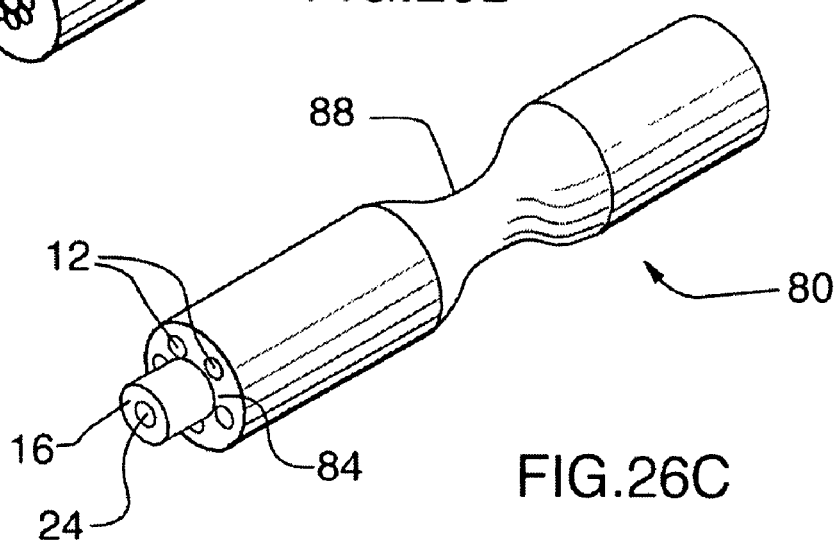
FIG. 26C, in a perspective view, illustrates a third step in the method for manufacturing an optical coupler illustrated in FIGS. 26A and 26B.

In yet other embodiments of the invention, an alternative optical coupler 910 is manufactured as shown in FIGS. 26A to 26C. As seen in FIG. 26A, this method uses a section of an air-clad fiber 80. The air-clad fiber includes a core 82 surrounded by a cladding 84 defining longitudinally extending air holes 86. To manufacture the optical coupler 910, the cladding 84 is etched to form a neck 88, as seen in FIG. 26B. Typically, the cladding 84 is etched as much as practically feasible to obtain a relatively narrow neck 88. Then, the air holes 86 are collapsed around the core 82, at least on one side of the neck 88. Subsequently, the first optical fiber 12 is optically coupled to the cladding 84 and the second fiber core 24 is optically coupled to the core 82, as seen in FIG. 26C.

Although the present invention has been described hereinabove by way of preferred embodiments thereof, it can be modified, without departing from the spirit and nature of the subject invention as defined in the appended claims.

What is claimed is:

1. A method for assembling an optical coupling assembly for optically coupling a first, a second and a third optical fiber using an optical coupler, said first, second, and third optical fibers defining respectively a first, a second and a third fiber free end, said optical coupler including a coupler first end section and a substantially opposed coupler second end section, said coupler first end section defining a first coupling surface, said coupler second end section defining a second coupling surface, said optical coupler defining a coupler passageway extending therealong between said coupler first and second end sections, said method comprising:

positioning said first fiber free end substantially adjacent to said first coupling surface;

optically coupling said first optical fiber and said first coupling surface to each other;

inserting said second optical fiber, at least partially, into said coupler passageway;

optically coupling said optical coupler second coupling surface and said second optical fiber to each other into said coupler passageway, positioning said third fiber free end substantially adjacent to said second fiber free end; and optically coupling said second and third fiber free ends to each other;

whereby light incoming in said optical coupler through said first coupling surface is guided by said optical coupler to pass through said second coupling surface and into said second optical fiber.

2. A method as defined in claim 1, wherein said second and third fiber free ends are positioned outside of said coupler passageway.

3. A method as defined in claim 1, wherein said second and third fiber free ends are positioned inside said coupler passageway.

4. A method as defined in claim 1, wherein said coupler passageway defines substantially opposed coupler passageway first and second ends located respectively substantially adjacent said coupler first and second end sections, said second and third fiber free ends being positioned substantially adjacent said coupler passageway second end.

5. A method as defined in claim 1, wherein
   before inserting said second optical fiber, at least partially, into said coupler passageway, said coupler passageway has an inner diameter substantially larger than an outer diameter of said second optical fiber; and optically coupling said optical coupler and said second optical fiber to each other into said coupler passageway includes collapsing said coupler passageway onto said second optical fiber.

6. A method as defined in claim 1, wherein said optical coupler defines a neck, said second and third fiber free ends being positioned substantially adjacent to said neck.

* * * * *